United States Patent [19]

Maeda

[11] Patent Number: 4,979,401

[45] Date of Patent: Dec. 25, 1990

[54] APPARATUS AND METHOD OF DETECTING ABNORMAL LOAD OF PRESSURIZING APPARATUS

[75] Inventor: Naoyuki Maeda, Inuyama, Japan

[73] Assignee: TRW Steering & Industrial Products (Japan) Co., Ltd., Aichi, Japan

[21] Appl. No.: 403,475

[22] Filed: Sep. 6, 1989

[30] Foreign Application Priority Data

| | | | |
|---|---|---|---|
| Sep. 8, 1988 | [JP] | Japan | 63-224962 |
| Dec. 23, 1988 | [JP] | Japan | 63-325304 |
| Mar. 7, 1989 | [JP] | Japan | 1-54837 |

[51] Int. Cl.[5] .............................................. G01L 5/00

[52] U.S. Cl. .................................... 73/862.54; 100/99

[58] Field of Search ................ 73/862.54, 788, 862.06; 100/99; 340/680; 364/474.07

[56] References Cited

U.S. PATENT DOCUMENTS

| | | | |
|---|---|---|---|
| 3,348,234 | 10/1967 | Foster | 340/680 X |
| 3,930,248 | 12/1975 | Keller | 100/99 X |
| 4,453,421 | 6/1984 | Umano | 73/862.54 |

FOREIGN PATENT DOCUMENTS

| | | | |
|---|---|---|---|
| 5922902 | 8/1981 | Japan . | |
| 571341 | 9/1984 | Japan . | |
| 2127973 | 4/1984 | United Kingdom | 100/99 |

OTHER PUBLICATIONS

Technical Report of Sakamura Kikai Seisakusho Ltd., "Energy Sensor Developed for Extra Large Size Former".

Product Specificiation of "Processa 3040-A", Processa Model 4040 and Processa Model 4010 Compact of Brankamp System Peozebautomation Gmbh.

*Primary Examiner*—Jerry W. Myracle

*Attorney, Agent, or Firm*—Tarolli, Sundheim & Covell

[57] ABSTRACT

An apparatus and a method for detecting an abnormal load for a pressurizing apparatus is disclosed, in which a load change of the work is detected by use of an effective power detector or a mechanical strain detector, and values obtained by sampling at a plurality of points of pressurizing time are compared with a normal value already stored. The result of comparison is used to detect an abnormal load condition.

24 Claims, 21 Drawing Sheets

APPARATUS AND METHOD OF DETECTING ABNORMAL LOAD OF PRESSURIZING APPARATUS

BACKGROUND OF THE INVENTION

The present invention relates to a pressurizing apparatus comprising a power source including a motor and a flywheel and a slide ram adapted for linear motion through a flywheel crankshaft to pressurize a material, or more in particular to an apparatus and a method of immediately detecting an abnormal condition and promptly finding a fault such as the breakage, cracking or wear or displacement by work grip failure of a punch or die of a pressure unit which may develop during the pressurizing work by the former.

References on an abnormal load detection apparatus relating to the present invention include JP-B-59-22902 (U) filed on Nov. 17, 1981 and JP-B-57-1341 filed on Jan. 14, 1980 by Sakamura Kikai Seisakusho Ltd., a technical report entitled "Energy Sensor Developed for Extra Large Size Former" for introducing new products of Sakamura Kikai Seisakusho Ltd., and product specifications "Processa 3040-A", "Processa Model 4040" and "Processa Model 4010 Compact" of Brankamp system Peozebautomation GmbH.

The abnormal load detection apparatuses disclosed in these references are operated in such a manner that a load cell embedded in the rear part of a punch or a die records a maximum or average value of load change for each pressurizing stroke or a sync signal is used to record an average value of load change within a predetermined specific partial area in a stroke, and the resulting value thus obtained is compared with a normal value for pressurizing the work within a tolerance thereby to detect an abnoramal condition or fault.

In these conventional apparatuses, a normal value is not compared with each of load changes sampled continuously in the process of work deformation at or in the vicinity of a pressurizing point of a moving pressure unit, and therefore it is impossible to detect with high accuracy an abnormal load which may occur instantaneously at a given time point while the work is under pressure.

Another disadvantage of these conventional apparatuses is that in view of the fact that the full load is imposed on a load cell providing a sensor, it is practically impossible to use a small-capacity high-sensitivity load call capable of detecting a very small change under an abnormal load and that the use of a single data of average or maximum load for each stroke of the pressurizing work to detect a fault fails to attain an abnormal load detection with high resolution.

SUMMARY OF THE INVENTION

Accordingly, it is an object of the present invention to provide an abnormal load detection apparatus in which a load change in the process of work deformation is determined by detecting the power consumption of a motor making up a power source, a mechanical strain of the former or a shock force of the pressurizing process by a sensor, and a signal thus obtained is converted into an electrical signal. The power consumption is detected by detecting the effective power or the power factor indicating the ratio of effective factor in the power consumption. The electrical signal thus detected is continuously sampled and stored. The stored value is compared with a normal value sampled previously. If the difference between the two values thus compared exceeds a tolerance, the pressurizing work is stopped. In detecting a load change from the power consumption of a motor, the power consumption is converted from analog to digital signals or from analog signal to frequency, and pulses thus generated are counted by a counter. This count is based on the data representing the amount of shift of a slide ram in actual pressurizing work. The data representing the shift of the slide ram is obtained as a pulse from an oscillator which derives a starting pulse from a trigger pulse generated at a predetermined position of the slide ram or a flywheel. Such a pulse may alternatively be obtained from a linear pulse encoder mounted on a slide ram or a rotary pulse encoder mounted on a crankshaft for converting the rotational energy of a motor into the linear motion of the slide ram. This pulse is used as a reference pulse for determining the timing of sampling. The V-F (voltage-frequency) of A/D conversion, counting of pulses, comparison and generation of a signal upon detection of a fault, are all effected by a controller including a CPU, a RAM, a ROM, an I/O interface, or other processing devices having the required functions.

The object of the present invention for detecting a load change from the mechanical strain of the former is attained by sampling an output of a strain gauge mounted on the former body.

According to another method of detecting a load change from a mechanical strain, a pulse encoder is mounted both on a flywheel crankshaft of a power source in rotary motion and on a slide ram for converting the rotational kinetic energy into a linear kinetic energy which is used for actual pressurizing work. A pulse signal from a rotary pulse encoder mounted on the flywheel crankshaft for detecting an angular displacement of the crankshaft and a pulse signal from a linear pulse encoder for detecting the displacement of the linear motion of the slide ram are counted, processed, compared and subjected to such process as normal-abnormal decision, so that the difference in the number of pulses produced under an abnormal load is used to detect a case of fault or abnormal condition, thus producing a fault signal for suspending the pressurizing work. The controller has built therein a CPU, a RAM as data memory, a ROM as program storage memory, a counter, and other processing devices having the required functions.

The object of the present invention for detecting a load change from an impact force is attained by sampling an output from a load cell embedded in the punch or die side.

According to an apparatus and a method of the present invention, a detected load change is sampled at a plurality of points for detecting an abnormal load, and therefore a very small abnoraml load condition including the breakage, cracking or wear of a die or displacement due to work grip failure which may develop during the pressurizing work and have an adverse effect on the work processing is easily and accurately detected.

According to a method of the present invention utilizing a mechanical strain, the displacement due to mechanical strain which may develop between the flywheel crankshaft and the slide ram of the machine during the pressurizing work is used as a signal representing a load condition, and the displacement due to strain is detected as a phase difference between pulses generated by two pulse encoders or more accurately as a difference in the number of pulses generated therebetween. It is thus possible to detect even a slight change in load signal with high sensitivity as a large amount of displacement, thereby assuring detection of high resolution of an abnormal load.

DESCRIPTION OF THE PREFERRED EMBODIMENTS

Figure 1:
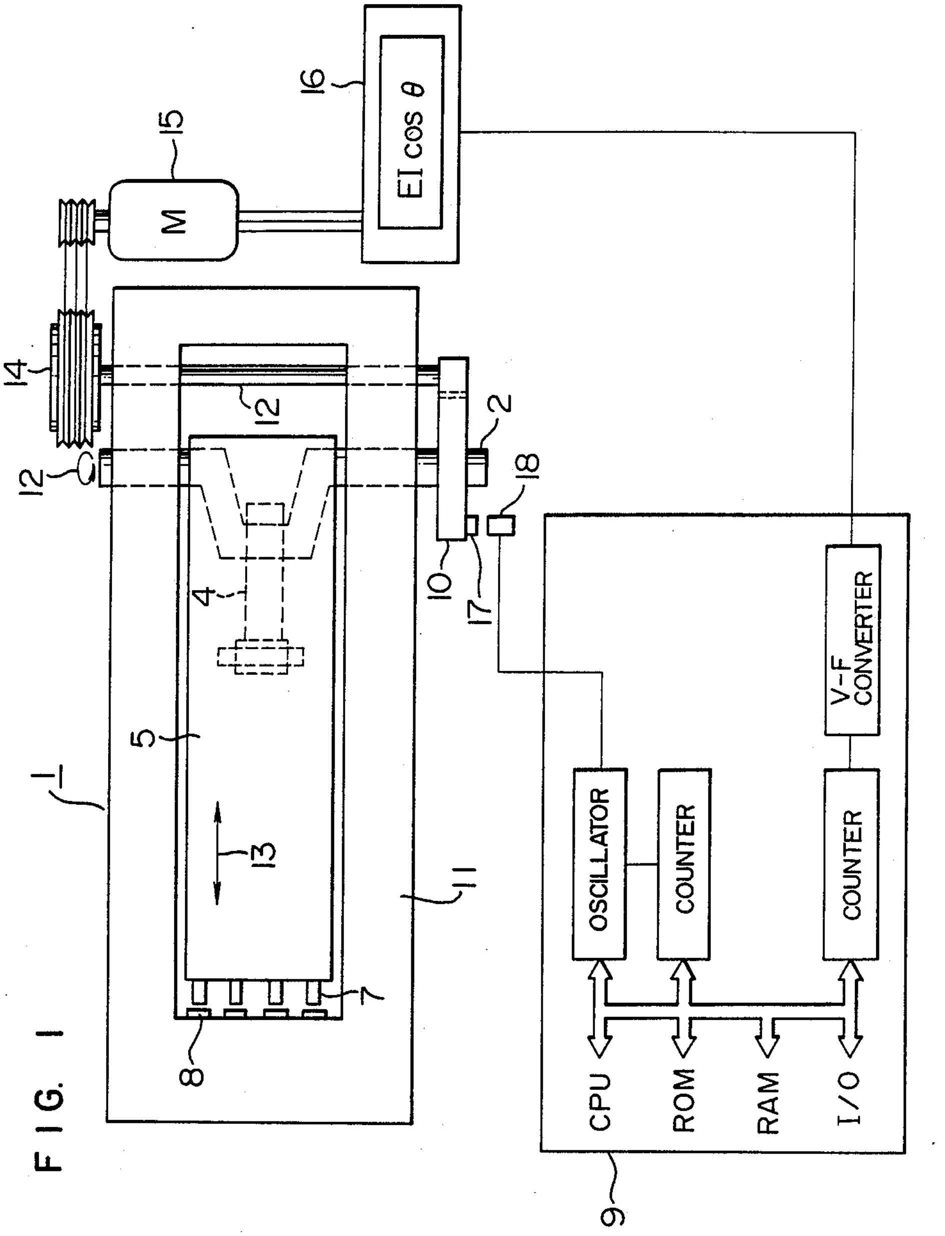
FIG. 1 is a diagram showing an example of configuration utilizing the effective power according to an embodiment of the present invention.

FIG. 1 shows an example of configuration of the present invention in which a load change is detected from the power consumption of a motor and a reference pulse is obtained from an oscillator in a controller 9. Numeral 1 designates a former body. The rotational energy of a motor 15 is transmitted through a pulley 14 and a shaft 12 to a flywheel 10 and stored therein. A flywheel crankshaft 2 is connected to a slide ram 5 by a connecting rod 4, so that the turning effort 12 of the flywheel crankshaft 2 is converted into a linear motion 13 of the slide ram 5. A punch 7 is mounted at the forward end of the slide ram 5, a die 8 is arranged on a frame 11 of a former 1 at a position in opposed relations with the punch 7. A proximity switch element 17 for generating a trigger pulse providing a start pulse for the oscillator in the controller 9 and a sensor 18 therefor are mounted on the flywheel 10. The motor 15 is connected with a power consumption detection means 16 for detecting the effective power EI $\cos\theta$ of the power consumption.

Figure 2:
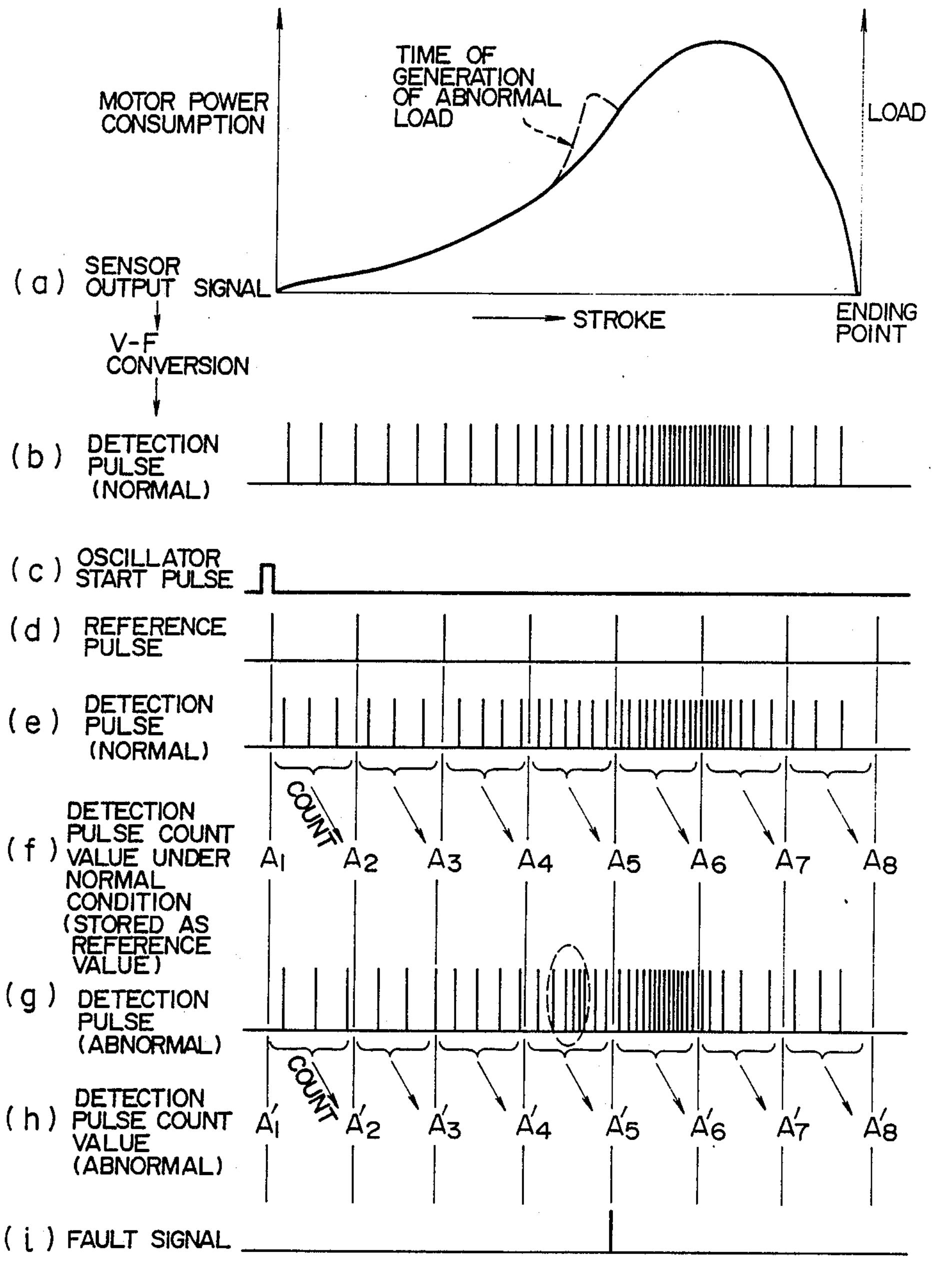
FIG. 2 is a diagram for explaining the operation of the embodiment shown in FIG. 1.

FIG. 2 shows the operation within the controller 9. This operation is entirely controlled by a program under the control of a CPU. A power consumption waveform for the pressurizing work assumes a smooth form as shown in FIG. 2(*a*) as an actual load change is somewhat integrated by the energy storage-discharge function of the flywheel 10. The power consumption waveform (a) is detected as a load change waveform by a power consumption detection means 16. The output thus produced is subjected to a V-F conversion, thereby producing a detection pulse output higher in frequency for a high power consumption as shown in (b). When the flywheel 10 rotates with the proximity switch element 17 passing through the sensor 18, the oscillator pulse of (c) is generated. This start pulse couses the oscillator within the controller 9 to be energized thereby to generate a pulse shown in (d) at reqular intervals of time. This pulse provides a reference used as a sampling pulse for counting detection pulses. A reference pulse may alternatively be generated at predetermined intervals of time by counting the time in accordance with a program instead of by using an oscillator. The count value of detection pulses is sampled and stored each time of generation of a reference pulse. The detection pulse count value may be reset each time of generation of a reference pulse or an integrated value. An example of resetting a counter each time a reference pulse is generated is shown in (e). The number of samplings is determined appropriately in advance by a program taking into consideration the time at which the change area of power consumption charged in the flywheel is capable of being caught, or a detection point.

A reference value is obtained by conducting the normal pressurizing work several times and averaging the count value of the detection pulses sampled for each reference pulse. The several pressurizing work for determining a reference value may be either initial several ones or given several ones of all the work that have already been conducted. As another alternative, an appropriate value may be written as a part of the program. A reference value is stored as A1, A2 and so on of (f). In actual pressurizing process, each time a reference pulse is generated, the count value of detection pulses sampled is compared with a reference value. If an abnormal load condition occurs as shown by dashed line in the waveform (a), the number of pulses at or around the time point of abnormal load occurrence increases as shown in (g). At this time, the detection pulse count value A'5 shown in (h) is compared with a reference value A5, and if the difference therebetween exceeds a tolerance (X), a fault signal (i) is generated thereby to stop the pressurizing work.

Figure 3:
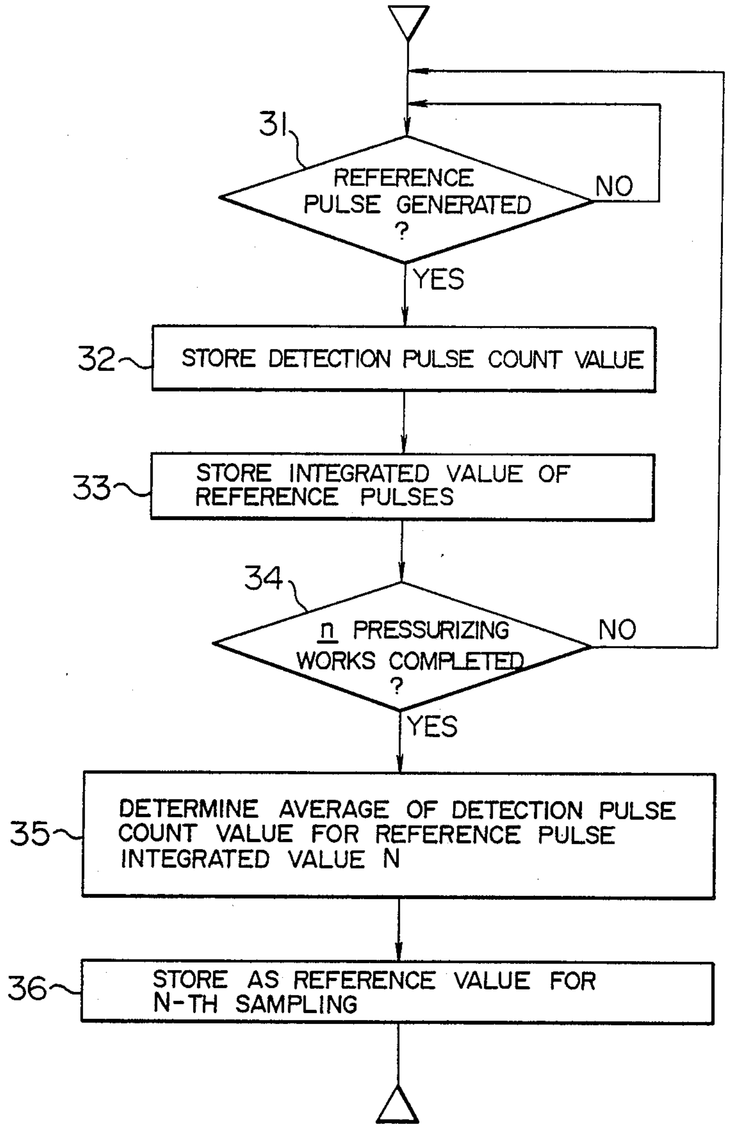
FIG. 3 and FIG. 4 are flowcharts of programs for executing the operation of the embodiment shown in FIG. 2.
Figure 4:
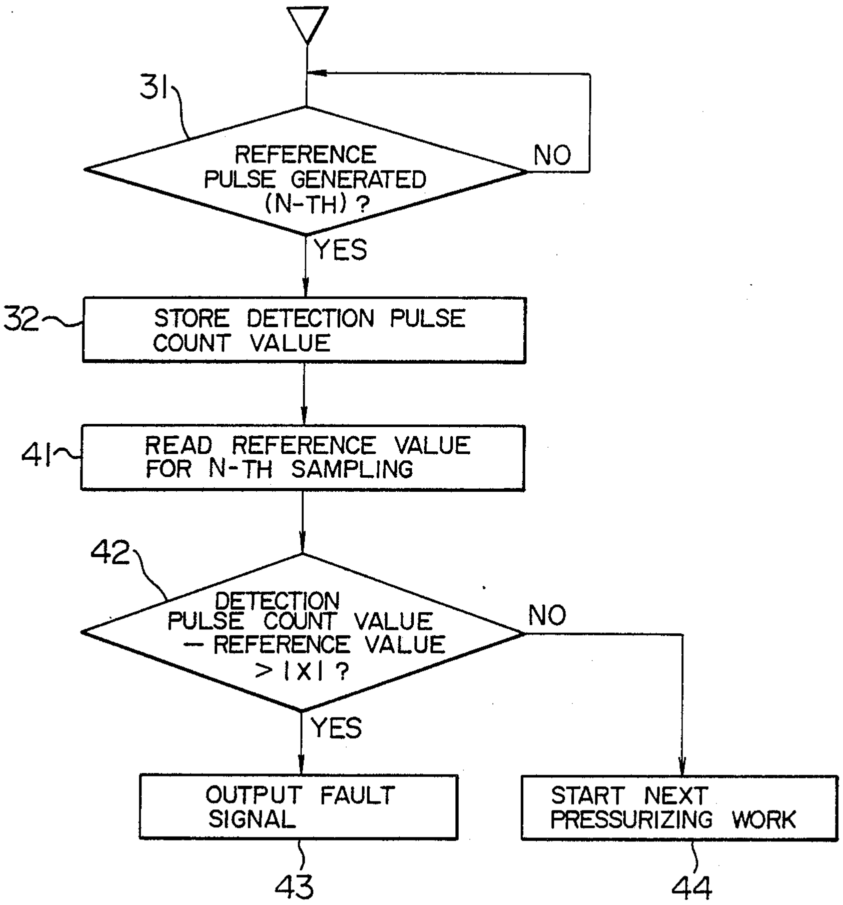

Program flowcharts are shown in FIGS. 3 and 4. The flowchart of FIG. 3 is for determining a reference value. Step 31 monitors the generation of a reference pulse, and upon generation of a reference pulse, step 32 stores the count value of detection pulses. Then, the integrated value of reference pulses is stored at step 33. Instead of storing an integrated value of reference pulses, the sampling number may be identified by the address of a memory for storing the count value of detection pulses each time of sampling thereof. Sampling is not necessarily effected each time of generation of a reference pulse but by a selected reference pulse. In order to determine an average value for a number n of normal pressurizing work repeated, step 34 monitors whether a number n of pressurizing work has been completed. At the end of a number n of pressurizing work, step 35 determines an average value of counts of the detection pulses for the same integrated value N of reference pulses associated with the number n of normal operations, and step 36 samples the average value and stores it as a reference value for the N-th detection pulse count.

A flowchart of a program for decision on abnormal load is shown in FIG. 4. Steps 31 and 32 sample a detection pulse count value from the N-th reference pulse. Step 41 reads the reference value for the N-th sampling from the memory, and step 42 determines the difference between the sampled value and the reference value, while at the same time checking to see whether the result of comparison exceeds the tolerance X assuring that the work piece is capable of being processed within the tolerance. If the difference exceeds the tolerance X, step 43 decides that a fault has occurred and produces a fault signal. If the difference does not exceed the tolerance X, step 44 starts the next pressurizing work.

In this embodiment, proximity switches 17 and 18 may be mounted on the slide ram 5 and the frame 11 respectively.

EMBODIMENT 2

Figure 5:
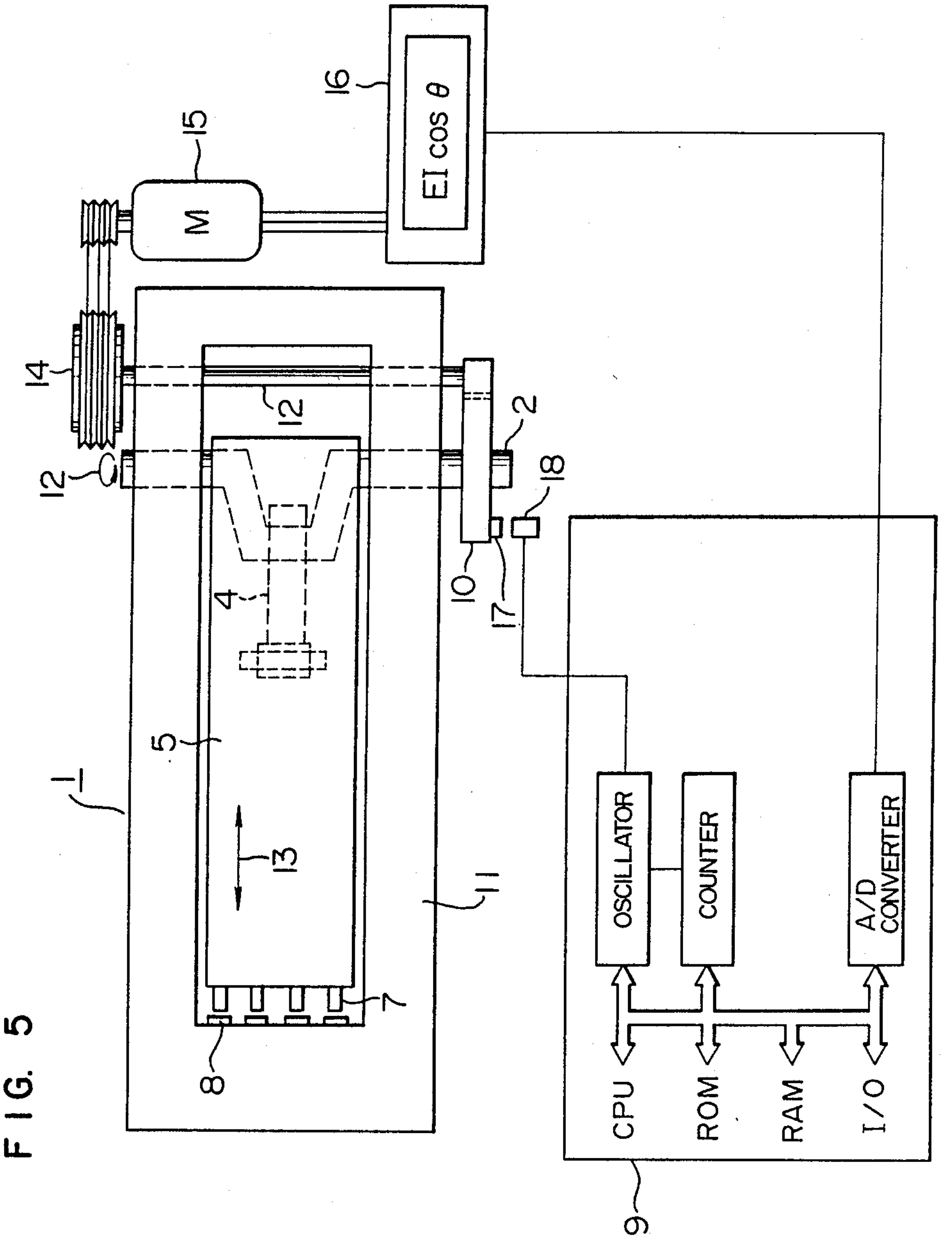
FIG. 5 is a diagram showing another embodiment of the present invention utilizing the effective power.
Figure 6:
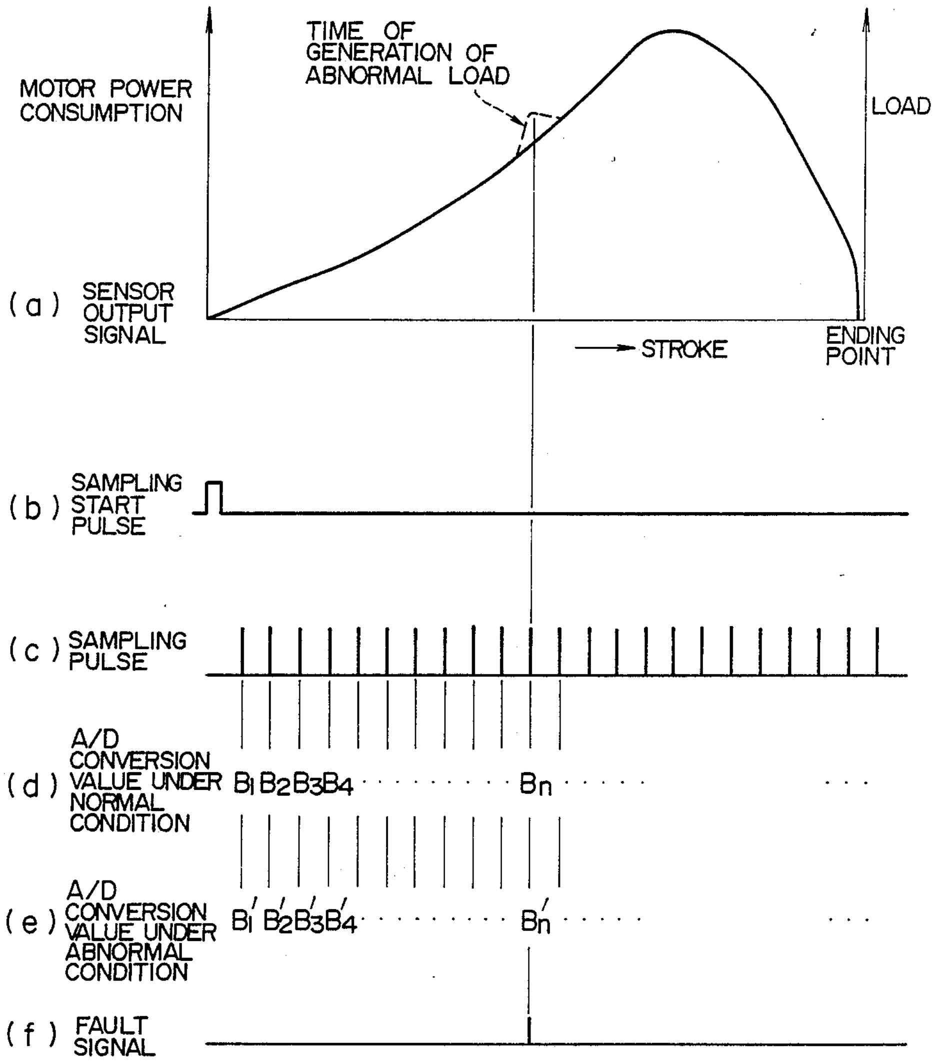
FIG. 6 is a diagram for explaining the operation of the embodiment shown in FIG. 5.

Power consumption may be detected as an analog value and subjected to analog-to-digital instead of voltage-to-frequency conversion and may be stored in digital form. A circuit configuration for such a method is shown in FIG. 5, and the operation thereof in FIG. 6. A start pulse shown in (b) is generated by proximity sensors 17, 18 or a program, and with this time point as a reference, an output signal of a power consumption detection sensor representing a load change is sampled. The sampling value is subjected to A/D conversion and stored in memory. Reference values are stored as B1, B2, so on as shown in (d). The reference value is determined in the same manner as in Embodiment 1. Each time of pressurizing work, the sampled analog signal is subjected to A/D conversion, and is stored as B1', B2', so on as shown in (e). If an abnormal load occurs as shown by the dashed line in FIG. 6, the A/D conversion value Bn' undergoes a considerable change, and if the difference thereof with the reference value Bn exceeds a tolerance X, a fault signal shown in (f) is generated thereby to stop the pressurizing operation.

A flowchart for the aforementioned operation is obtained by replacing the count value of detection pulses with an A/D conversion value in FIGS. 3 and 4.

In the process of comparison, each A/D conversion value may be compared with each corresponding reference value, or the sum of a predetermined continuous number of A/D conversion values may be compared with a corresponding normal value. As another alternative, an integrated value of A/D conversion values may be compared with a corresponding normal value for each predetermined number of samplings.

The above-mentioned methods of comparison of A/D conversion value are applicable also to all other embodiments.

The proximity switches 17, 18 may be mounted on the slide ram side.

EMBODIMENT 3

Figure 7:
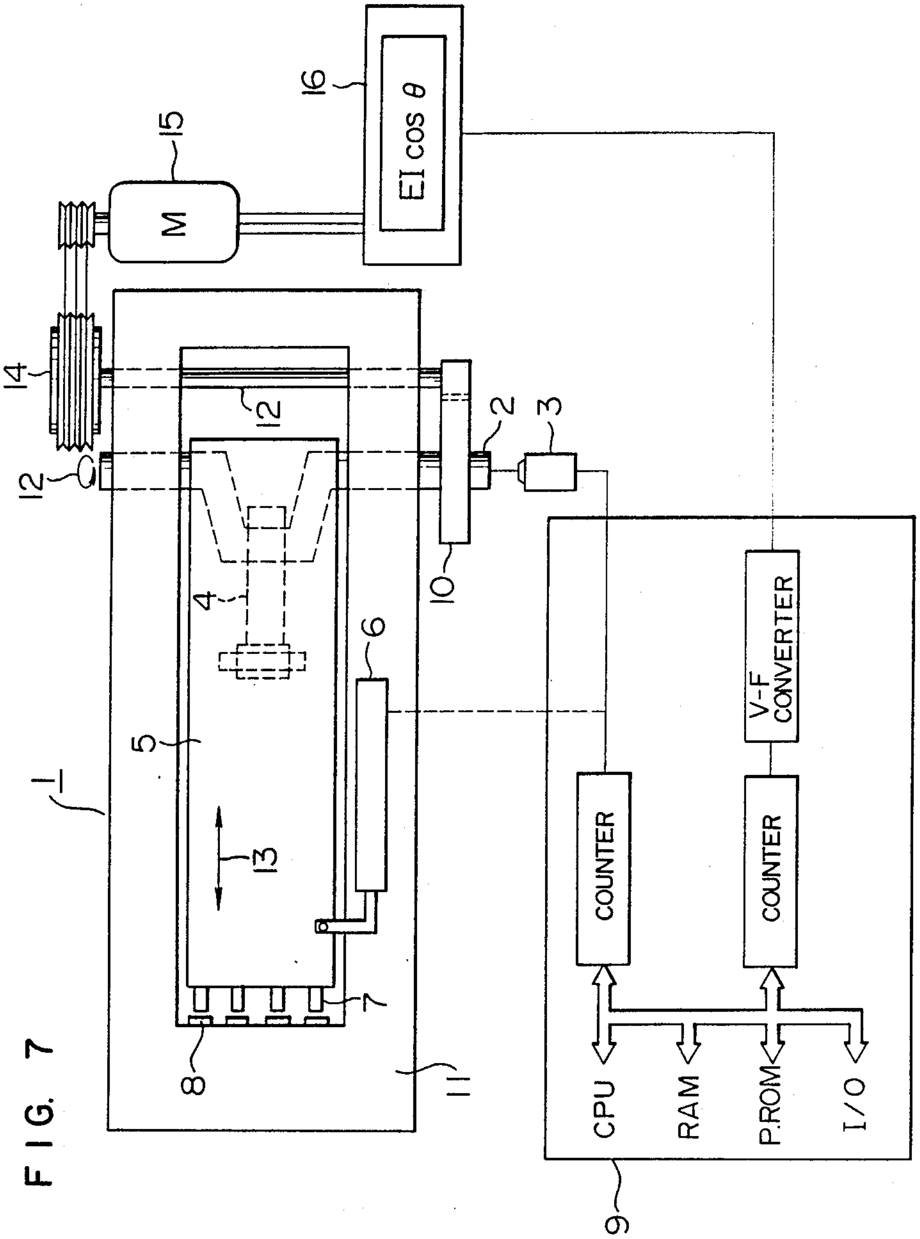
FIG. 7 is a diagram showing still another embodiment of the invention utilizing the effective power.

FIG. 7 shows another embodiment in which a load change is detected from the power consumption of a motor and a reference pulse is produced from a rotary pulse encoder 3 mounted on a flywheel crankshaft 2. If a rotary pulse encoder having a start pulse built therein is used in this embodiment, the oscillator in the controller and the proximity switch for generating the start pulse of the oscillator are eliminated. The operation of this embodiment is identical to that of FIG. 2 lacking the oscillator start pulse (c). The flowchart of the program of this embodiment is the same as FIGS. 3 and 4.

The same object of operation is also achieved by a linear pulse encoder 6 having a start pulse built therein mounted on the slide ram side instead of a rotary pulse encoder.

EMBODIMENT 4

Figure 8:
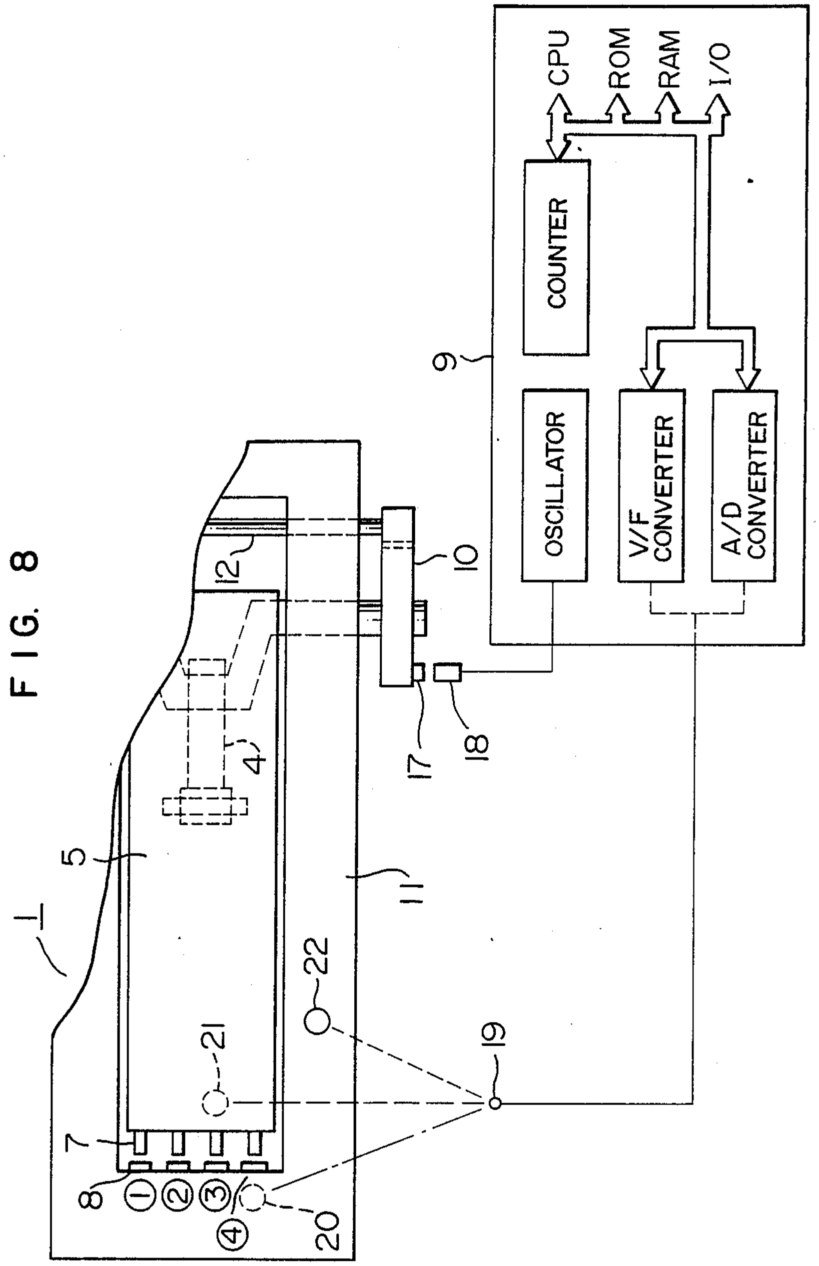
FIG. 8 is a diagram showing still another embodiment of the invention utilizing the mechanical strain.
Figure 9:
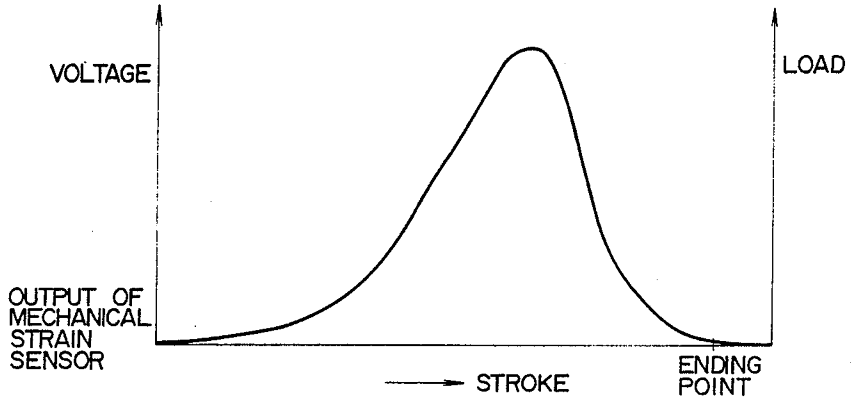
FIG. 9 is a sensor output diagram according to an embodiment of the present invention.

An embodiment in which a load change is detected from mechanical strain by a sensor which converts the load change into an electrical signal is shown in FIG. 8. A load cell or a piezoelectric device is generally known as a device for converting a mechanical strain into an electrical signal. Numeral 20 designates a load cell embedded in a die 8, and numeral 21 designates a load cell embedded in a punch 7. Numeral 22 designates a piezoelectric device mounted on a frame 11. A signal produced from one of the sensors 20 to 22 is applied to a controller 9 and subjected to V-F conversion, or a signal subjected to A/D conversion is sampled and stored. A corresponding output of a machine strain sensor representing the particular load change is shown in FIG. 9. The waveform of FIG. 9 has a high-frequency noise eliminated by filter. The related operation is identical to those of embodiments 1 or 2.

Figure 10:
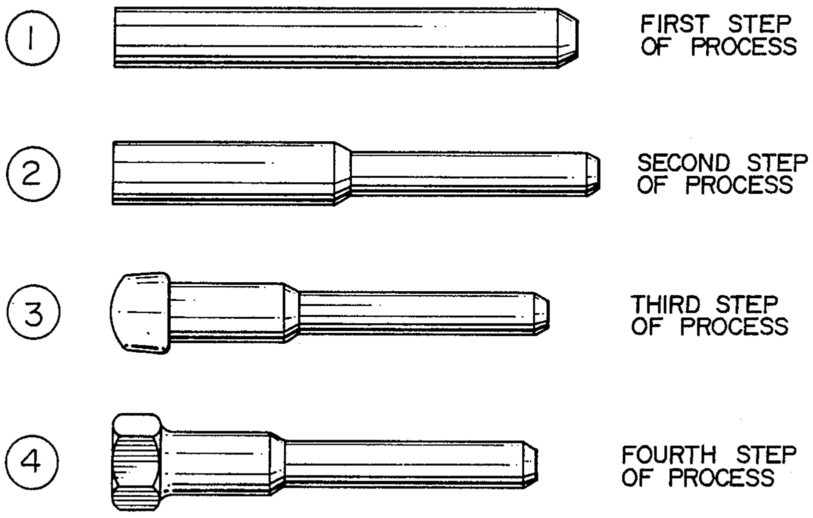
FIG. 10 is a diagram showing specific steps of the pressurizing work.
Figure 11:
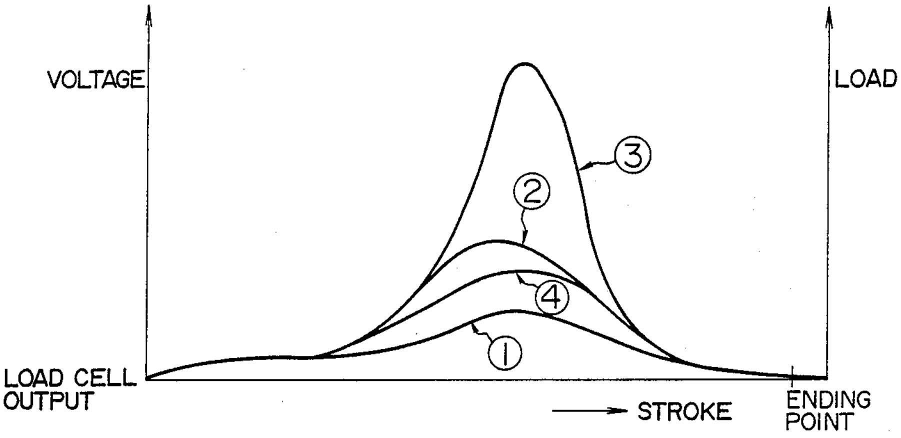
FIG. 11 is a diagram showing an output of a sensor produced at each processing step shown in FIG. 10.

Specifically, assume that the four steps of process shown in FIG. 10 are accomplished simultaneously in parallel way by each of the dies ① to ④ shown in FIG. 8. If a load cell is embedded in the punch 7 or each of the dies 8, outputs of the load cells are detected in the waveforms, ① to ④ corresponding to the respective steps ① to ④ as shown in FIG. 11. A plurality of these detection signals are processed in parallel by the operation of Embodiment 1 or 2 thereby to assure detection of an abnormal load with higher accuracy.

According to this embodiment also, the proximity switches 17 and 18 may be mounted on the slide ram side.

EMBODIMENT 5

Figure 12:
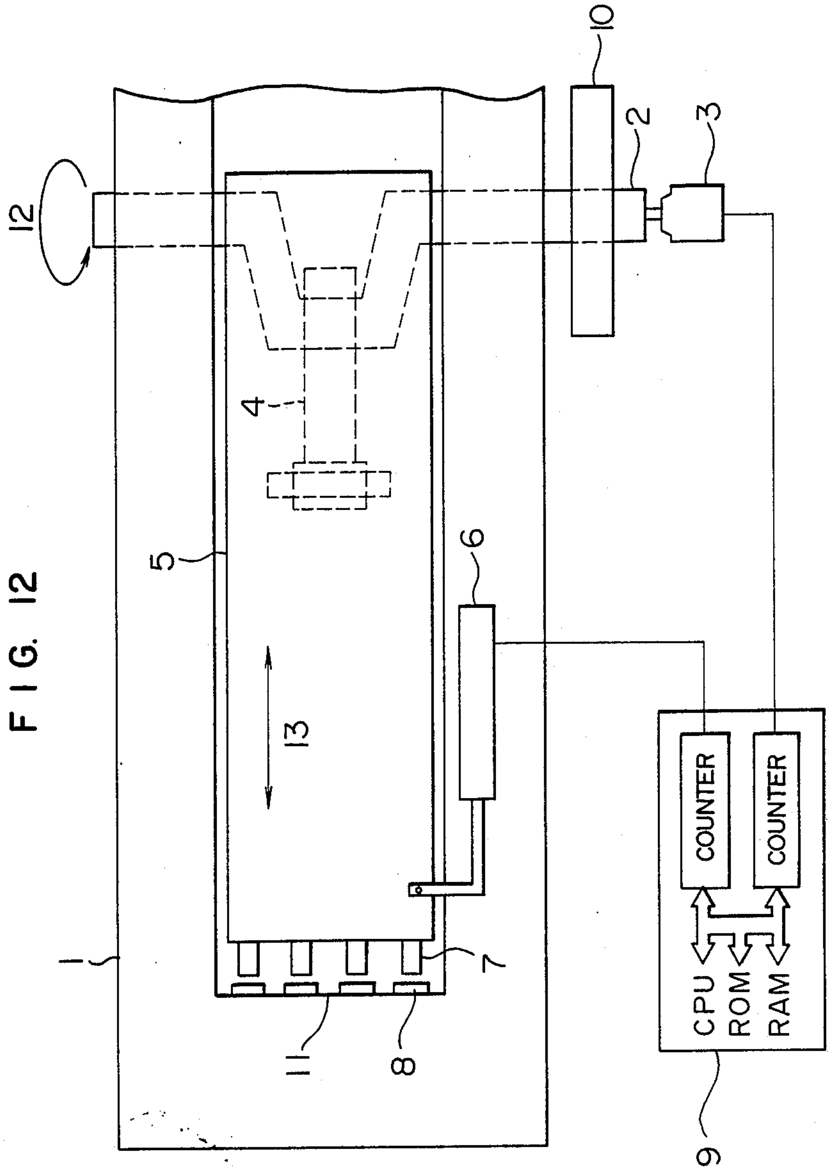
FIG. 12 is a diagram showing still another embodiment of the invention utilizing the mechanical strain.

Another embodiment in which a load change is detected from mechanical strain is shown in FIG. 12.

A rotary pulse encoder 3 is mounted on a flywheel crankshaft 2 of a former 1. A pulse produced from this encoder 3 is used as a reference pulse.

A linear pulse encoder 6 is mounted on a slide ram 5. A pulse produced from this encoder 6 is used as a detection pulse.

Figure 13:
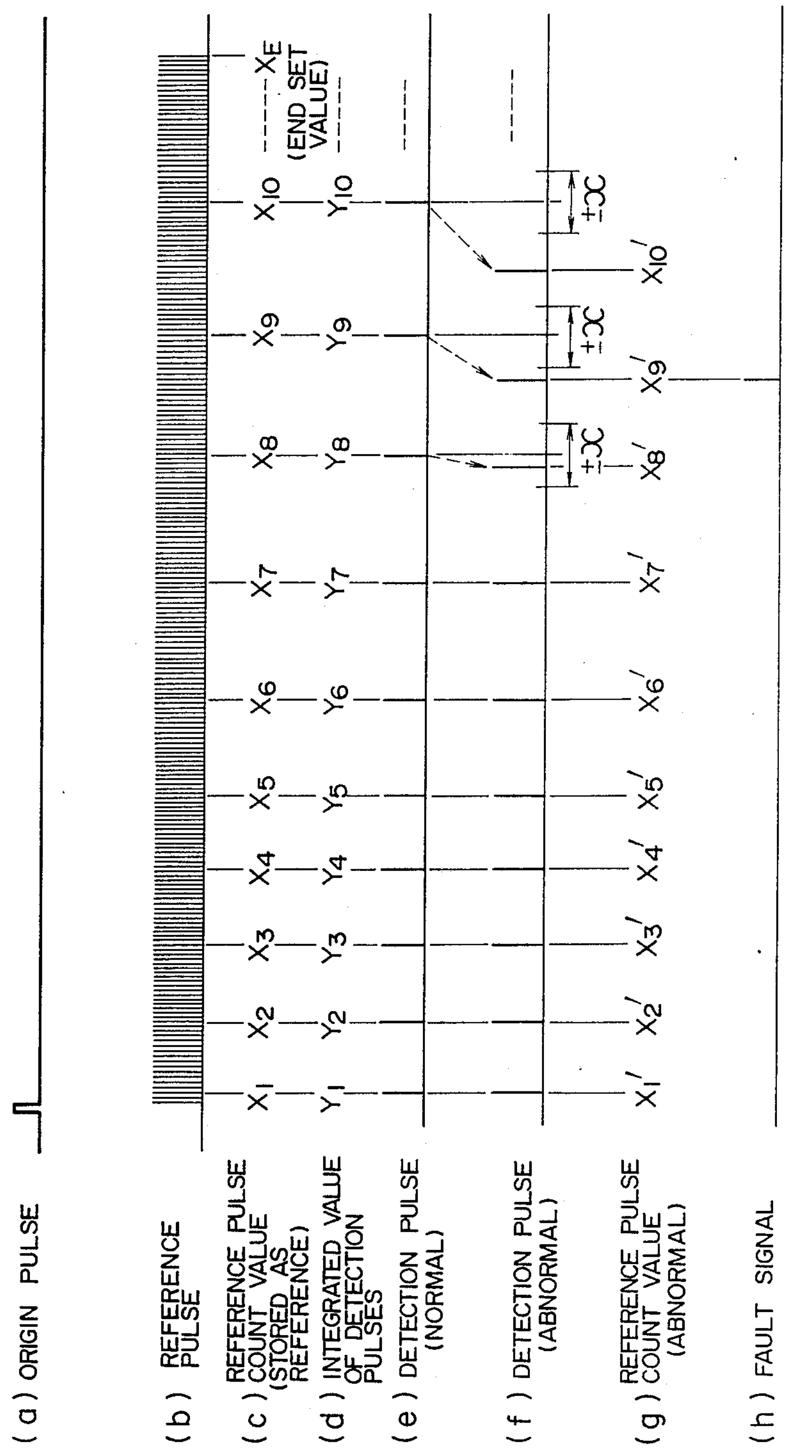
FIG. 13 is a diagram for explaining the operation of the embodiment shown in FIG. 12.
Figure 14:
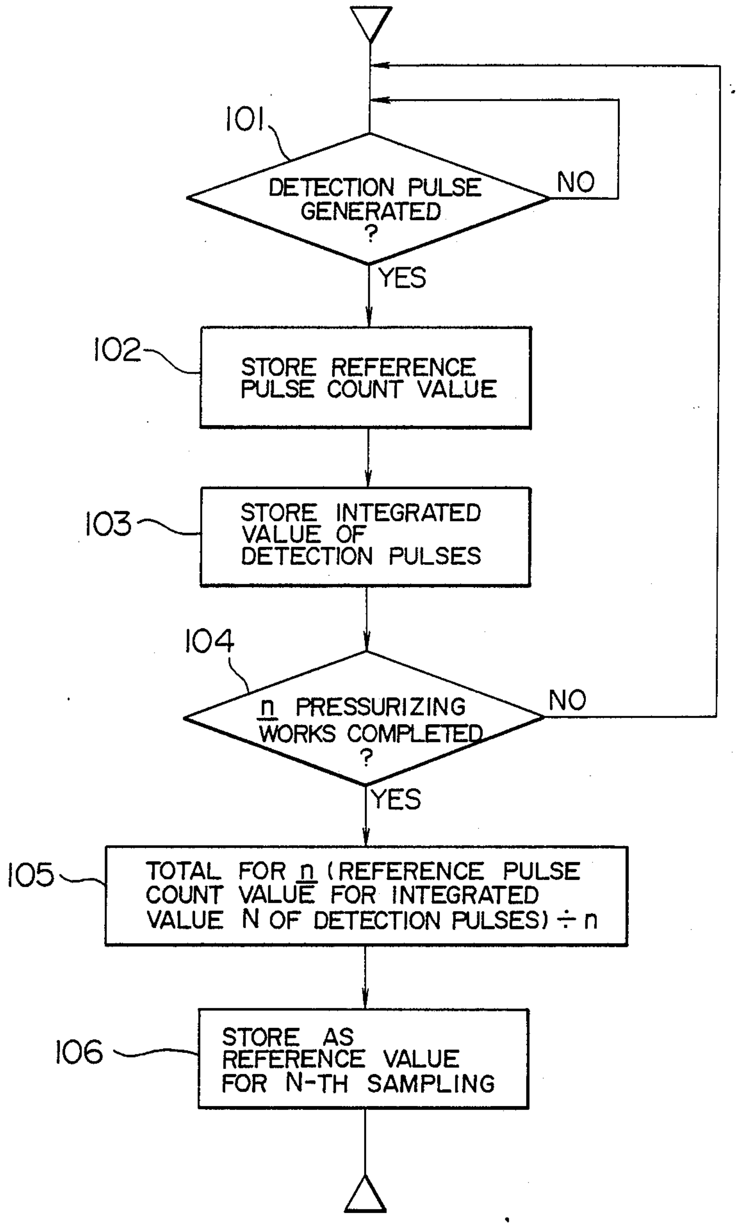
FIG. 14 and FIG. 15 are flowcharts based on the operation explained in FIG. 13.
Figure 15:
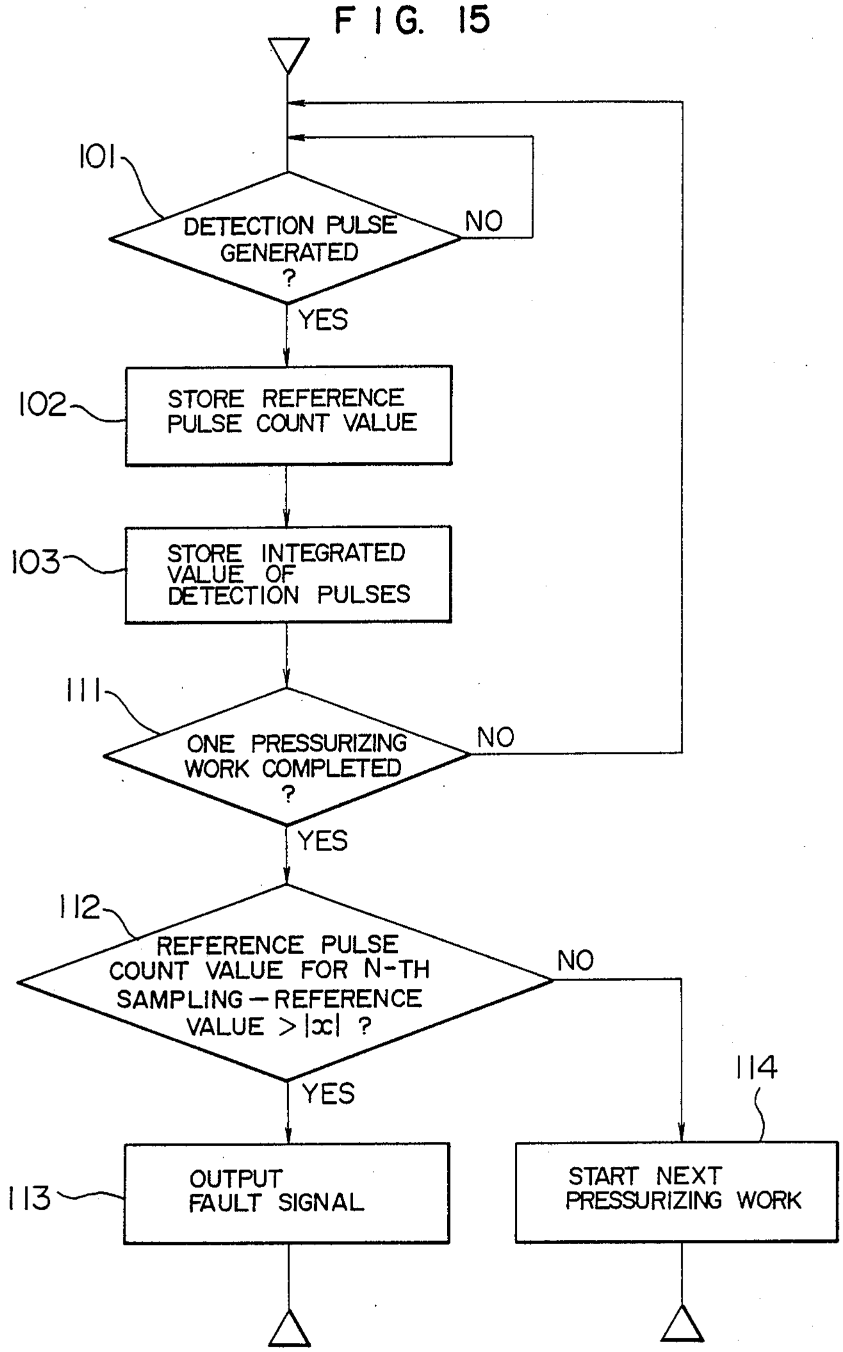
Figure 16:
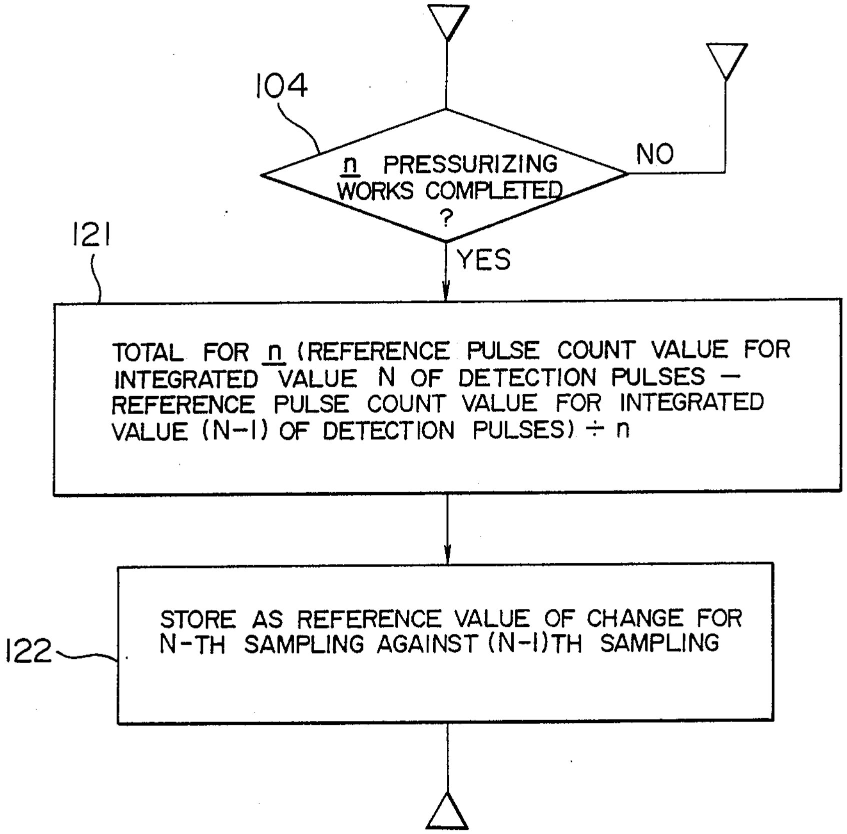
FIG. 16 and FIG. 17 are flowcharts showing another embodiment of means for abnormal load decision.
Figure 17:
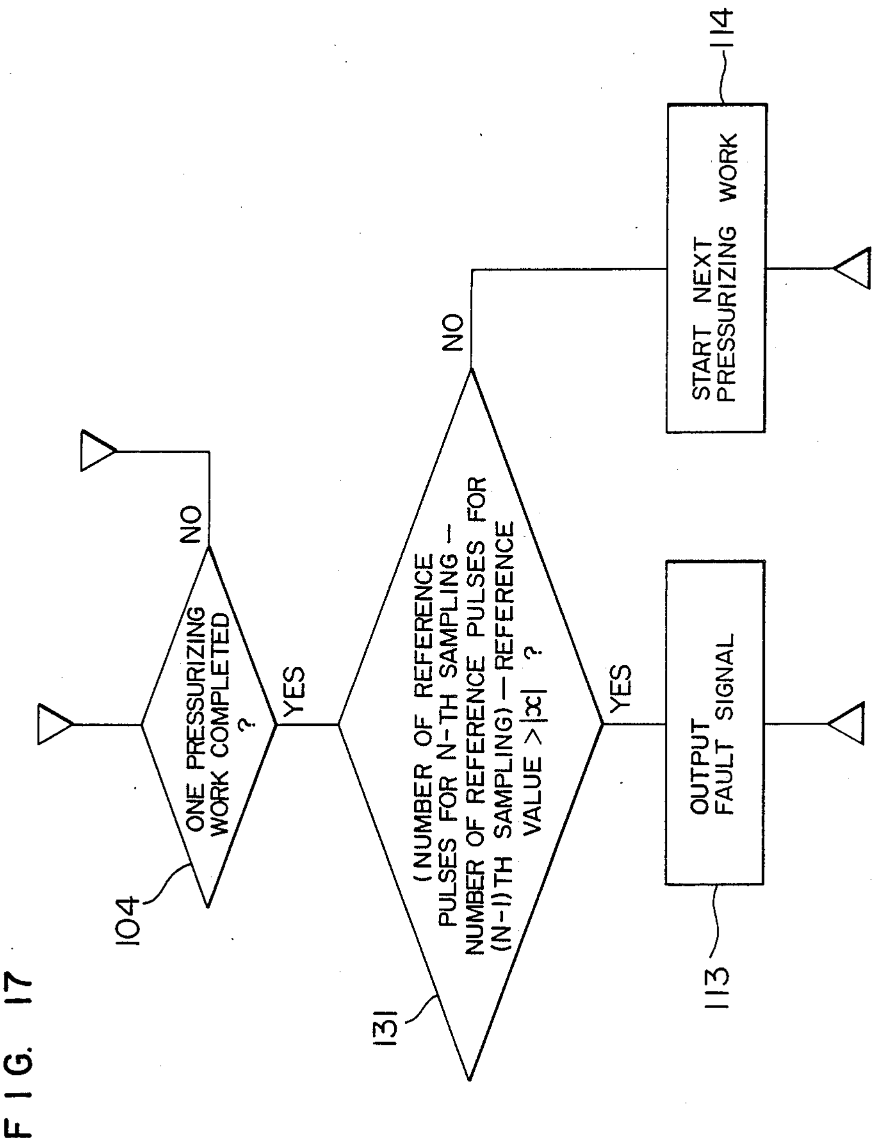

The resolution of the pulse encoder is set in such a manner that a plurality of pulses from the rotary pulse encoder 3 are available between adjacent pulses of the linear pulse encoder during the operation of the slide ram 5. (That is to say, the more the pulses, the higher the resolution) Upon application of pressure on the work from the slide ram 5, a displacement strain is generated in the machine, and therefore the motion of the slide ram 5 is substantially delayed, thereby lengthening the period of generation of a detection pulse as compared with a reference pulse. The period of the detection pulse faithfully reflects the speed change of the slide ram 5. The period of generation of the reference pulse, however, is not much affected in view of the fact that the change in rotational speed of the flywheel crankshaft 2 remains small due to the accumulated energy for rotations stored in the flywheel 10. FIG. 13 shows the operation of a fault detection according to the present embodiment. Upon starting the pressurizing work, an origin detector built in the rotary pulse encoder 3 generates an origin pulse (a), and counters in the controller 9 are energized to start counting the reference pulses (b) from the rotary pulse encoder 3 and the detection pulses (e) or (f) from the linear pulse encoder 6. In synchronism with the generation of a detection pulse, the controller 9 samples the count value of the reference pulses, and the value thus obtained is stored in memory. The count value of detection pulses indicates the number of samplings of reference pulses directly or indirectly. If the count value of detection pulses is not stored, means may be provided for identifying the sampling number by the address of a memory for storing the count value of reference pulses each time of sampling. Sampling may not be effected each time of generation of a detection pulse but for selected detection pulses. After initial several pressurizing work in normal operation, an average count value of reference pulses (X1, X2, so on) for each count value (Y1, Y2, so on) of detection pulses is determined and stored in a memory as a standard value (c) under normal operation. The count value of reference pulses may be either an integrated value from operation start to completion, or a count value in each sampling period reset each time and fetched separately. A flowchart for determining an average value is shown in FIG. 14. Step 101 sees the generation of a detection pulse, and steps 102 and 103 sample a count value of reference pulses from the counters and an integrated value of detection pulses associated therewith and store them in a memory. On the assumption that an average value for a number n of times of normal pressurizing work is determined, step 104 recognizes the end of a number n of pressurizing work cycles. Step 105 determines an average value by dividing by n the total for a number n of counts (a reference pulse count value for the same integrated value N of detection pulses) for a number n of cycles. Step 106 stores the average value as a reference value in memory. Reference pulses against detection pulses are naturally varied even in normal operation, and such variations are processed as a tolerance (±X) at the time of normal-abnormal decision mentioned below. If a fault such as die breakage, cracking or wear or work grip failure occurs in actual pressurizing process, the load decreases suddenly, and therefore the feed rate of the slide ram 5 is instantaneously increased at the time of the fault as compared with in normal operation. As a result, a detection pulse is generated earlier as shown by dashed arrow in FIG. 13(f). This causes some count values (X1', X2', so on) of reference pulses at the time of generation of detection pulses (X9') are deviated from the range of tolerance for normal operation. This relationship of generation of detection pulses and reference pulses at the time of a fault (f) and (g) is stored in memory in advance. This data is compared with a reference value (c) for normal operation and, if the result exceeds a tolerance (±X) set in advance, a fault signal (h) indicating the generation of a fault is produced. The end of pressurizing work is recognized in software by setting the number of reference pulses to a predetermined value. Upon generation of a fault signal (h), the air clutch in the flywheel 10 is separated, and the pressurizing work stops instantaneously, thus preventing the pressurizing work from being repeated under abnormal condition. The number n of pressurizing operations for determining an average value as a reference value is performed by alternating between two methods selectively. In one method, an average is taken for the first number n of pressuring work out of a plurality of pressuring operations continuously repeated and the value thus obtained is not updated until a predetermined number of pressuring operations is finished. In the other method, an average for a given number n of pressuring operations performed already is determined, and with the repetition of pressuring operations, a new number n of pressuring operations is selected to update the average value constantly. A flowchart for the present embodiment is shown in FIG. 15. Step 101 checks to see whether a detection pulse is generated or not. If a generation of a detection pulse is recognized, steps 102 and 103 sample two pulse count values, which are then stored in memory. This process of operation is repeated unitl a cycle of pressurizing work is completed. Upon detection of the end of a cycle of pressurizing work at step 111, step 112 subtracts a reference pulse count value for the N-th sampling stored as a reference value from a reference pulse count value for the N-th sampling (N: Integer), and if the result of subtraction exceeds the tolerance X, step 113 produces a fault signal, while if the tolerance X is not exceeded, step 114 produces a signal for starting the next cycle of pressurizing work. The number N of samplings coincides with the integration value of detection pulses, and therefore a reference pulse for the N-th sampling is easily searched for within a memory. If an integration value of detection pulses is not used, the number N indicating the sampling number may be determined by a memory address. In such a case, step 103 is omitted. Unlike the present embodiment in which count values of reference pulses associated with the generation of detection pulses are compared with each other, the increase or decrease in reference pulses may be determined by comparison between detection pulses as another embodiment. A flowchart for determining an average value in such a case is obtained by changing steps 105 and 106 in FIG. 14 to have the contents of steps 121 and 122 in FIG. 16 respectively. A flowchart for comparison according to the present embodiment is for seeing whether a tolerance X is exceeded by the difference between a reference value and a reference pulse count value for the N-th sampling less a reference pulse count value for the (N−1)th sampling. As a further embodiment, the count value of detection pulses may not be limited to an integration value but the sum of a detection pulse count value and a reference pulse count value may be used for comparison or the difference between the two pulse count values may be compared. A flowchart for such a purpose is realized by changing the steps 105 in FIG. 14 and step 112 in FIG. 15 to determine the sum or difference between a detection pulse count value and a corresponding reference pulse count value.

EMBODIMENT 6

This embodiment is so configured that more pulses are generated per unit time from a linear pulse encoder than from a rotary pulse encoder. No operational problem is posed, however, if substantially the same number of pulses are produced from both pulse encoders. This configuration is identical to that shown in FIG. 12.

Figure 18:
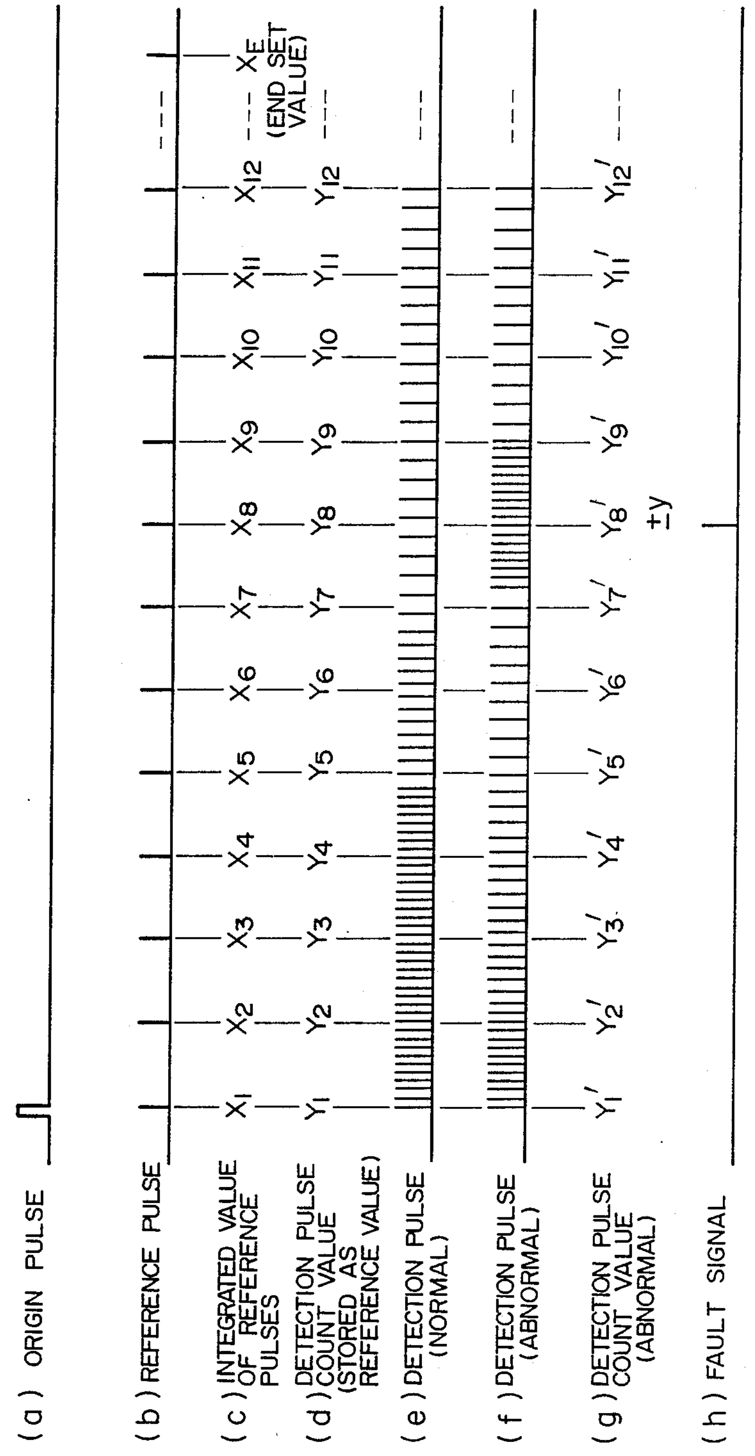
FIG. 18 is a diagram for explaining the operation of still another embodiment having the configuration shown in FIG. 12.
Figure 19:
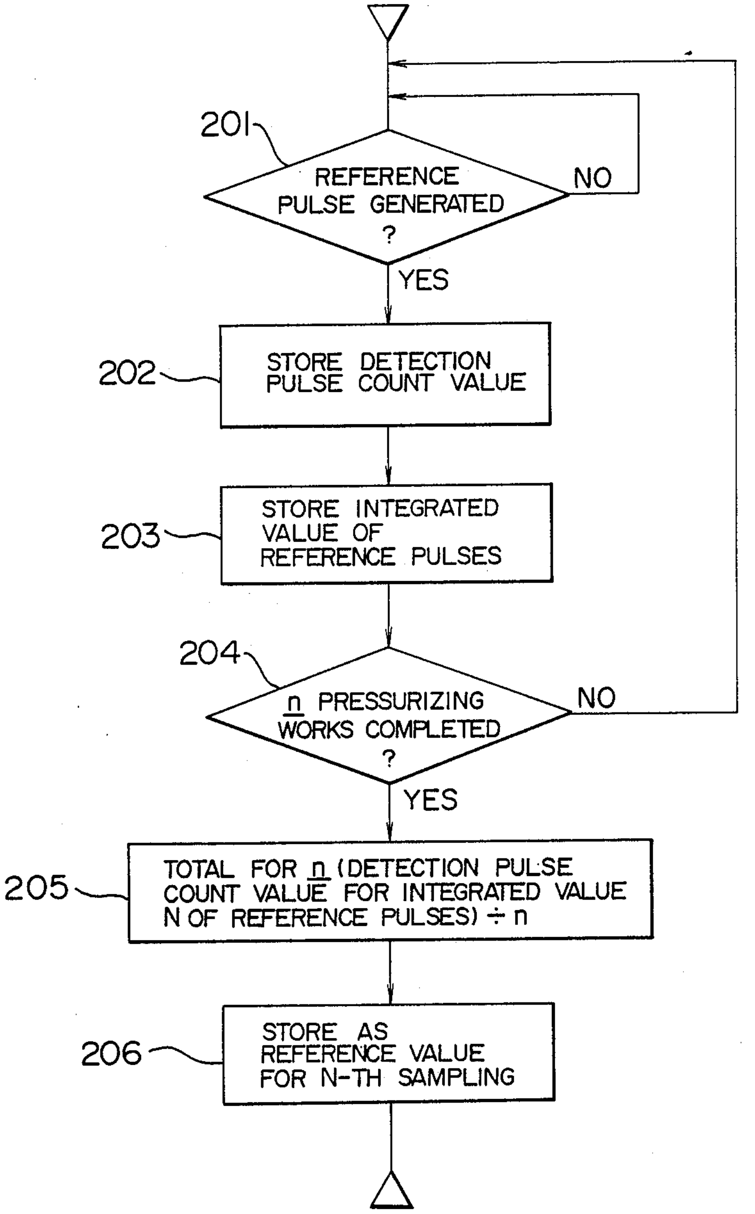
FIG. 19 and FIG. 20 are flowcharts based on the operation explained in FIG. 18.
Figure 20:
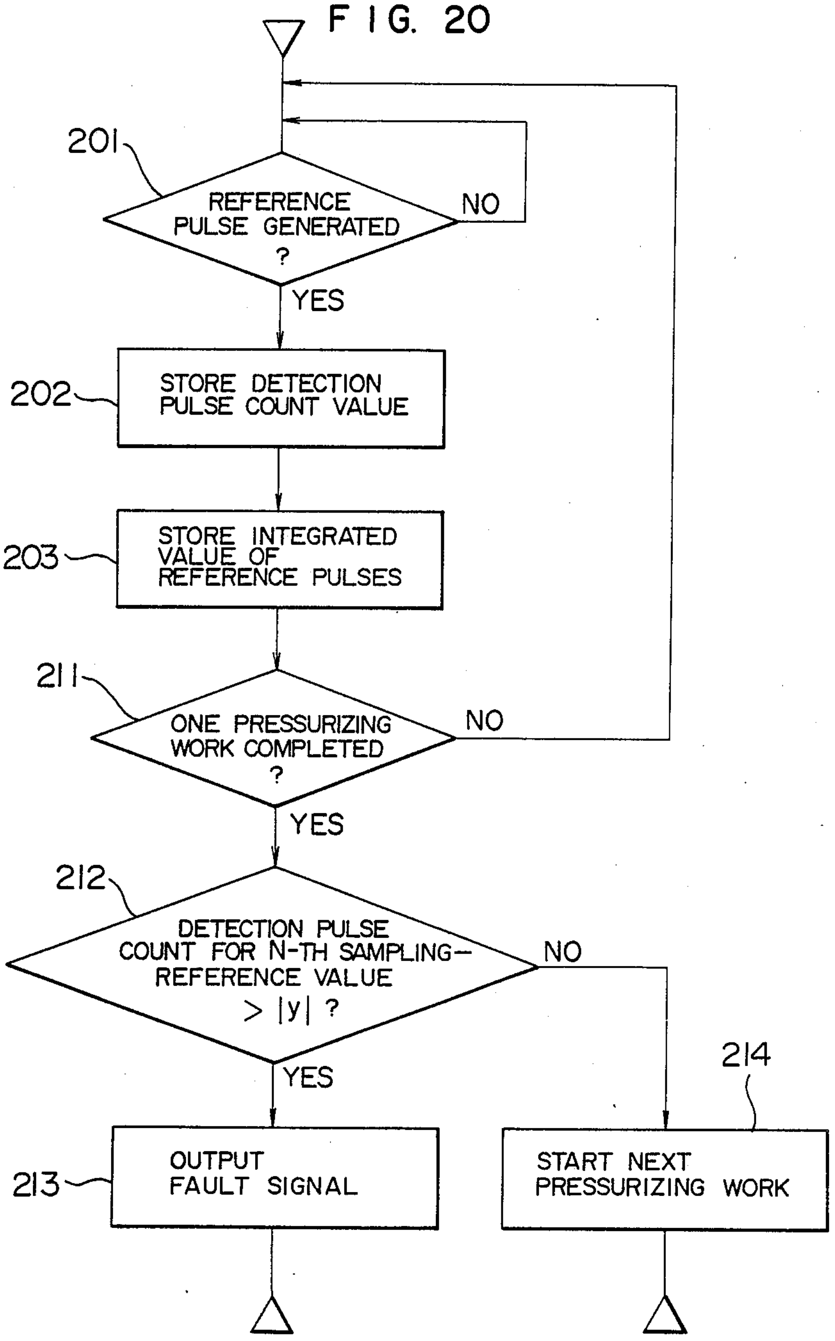
Figure 21:
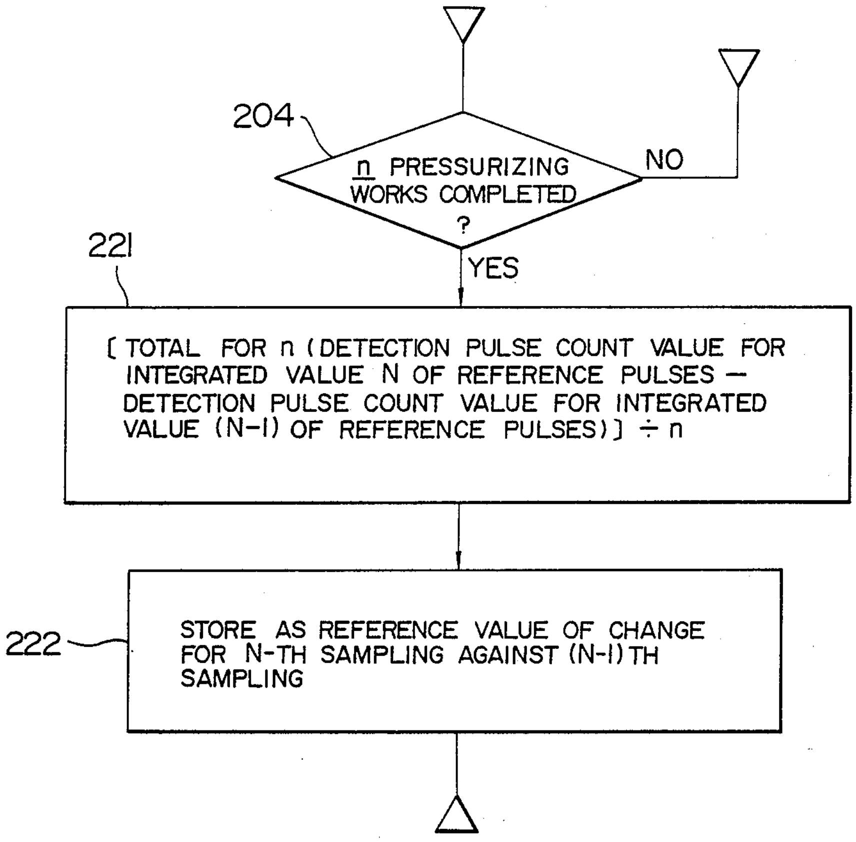
FIG. 21 and FIG. 22 are flowcharts showing another embodiment for abnormal load decision.
Figure 22:
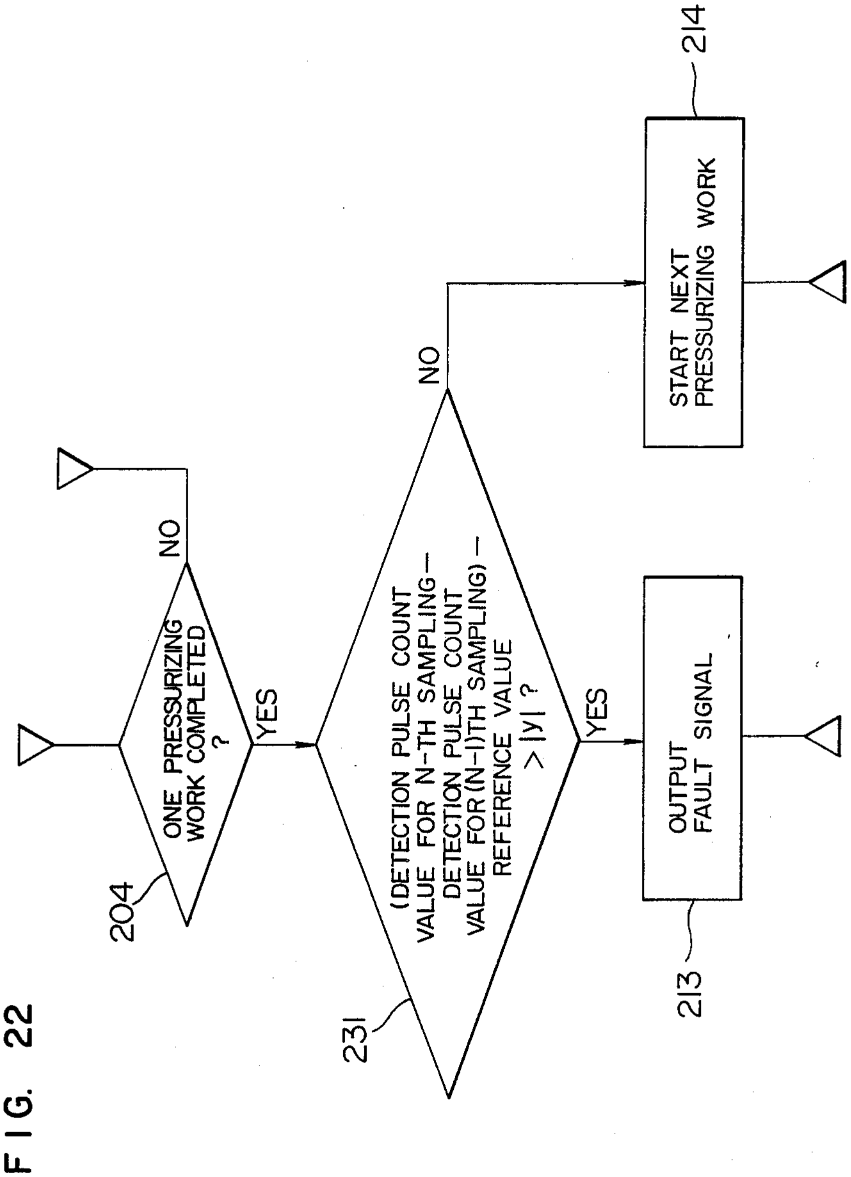

FIG. 18 is a diagram for explaining the operation of fault detection according to the present embodiment. With the start of pressurizing work, an origin pulse (a)

is generated from an origin detector built in a rotary pulse encoder 3, and counters in a controller 9 begin to count reference pulses (b) from a rotary pulse encoder 3 and detection pulses (e) or (f) from a linear pulse encoder 6. The controller 9 samples a count value of detection pulses in synchronism with the generation of reference pulses, and values thus obtained are stored sequentially in memory. The count value of reference pulses indicates the number of samplings of detection pulses directly or indirectly. If count values of reference pulses are not stored, the sampling number may be identified from the memory addresses stored each time of sampling of a count value of detection pulses. Sampling need not be effected for each reference pulse but for selected reference pulses. Initially, an average count value (Y1, Y2, so on) of detection pulses for each count value (X1, X2, so on) of reference pulses is determined through several normal pressurizing operations, and is stored as a reference value (d) for normal operation in memory. The count value of detection pulses may be either an integration value from operation start to completion or a count value for each sampling section which is reset and fetched each time. A flowchart for determining an average count value is shown in FIG. 19. Step 201 checks to see whether a reference pulse is generated, and upon recognition of the generation of a reference pulse, steps 202 and 203 sample a count value of reference pulses and that of detection pulses and store them in memory. Assume that an average value is obtained by repeating normal pressurizing work a number n of times. Upon recongition of the end of a number n of pressurizing cycles at step 204, step 205 divides the total of a number n of count values (a count value of detection pulses for the same reference pulse integration value N) for a number n of cycles by n thereby to determine an average value. Step 206 stores this average value in memory as a reference value. Detection pulses generated against reference pulses, which are naturally subjected to variations even within a normal operation, are appropriately processed as a tolerance (±y) at the time of abnormal-normal decision mentioned below. If such a fault as die breakage, cracking or wear or work grip failure occurs in actual pressurizing process, the load is decreased suddenly, and therefore the feed rate of the slide ram 5 is instantaneously increased at the time point of the fault as compared with at the time of normal operation, resulting in detection pulses being generated earlier as shown in (f). As a result, some count values (such as Y8′) out of the count values (Y1′, Y2′, so on) of detection pulses at the time of generation of reference pulses are deviated from the range of tolerance for normal operation. The relationship of generation between detection pulses and reference pulses as designated in (c) and (f) in abnormal operation is compared with the reference value (d) for the normal operation stored in memory, and if the result of comparison exceeds a tolerance (±y) set in advance, a fault signal (h) indicating a fault is generated. The end of pressurizing work is recognizable in software by setting the number of reference pulses to a predetermined level beforehand. Upon generation of a fault signal (h), an air clutch in a flywheel 10 is separated, and the pressurizing work is instantaneously stopped in such a manner as to inhibit the pressurizing work being repeated under abnormal conditions. A flowchart for the present embodiment is shown in FIG. 20. Step 201 checks to see whether a reference pulse is generated. Upon recognition of a reference pulse generated, steps 202 and 203 sample two pulse count values and store them in memory. This process of operation is repeated until the end of a cycle of pressurizing work is complete. Upon detection of the end of a cycle of pressurizing work at step 211, step 212 subtracts a detection pulse count value for the N-th sampling stored as a reference value from a count value of detection pulses for the N-th sampling (N: Integer), and if the result exceeds a tolerance y, step 213 produces a fault signal. Otherwise, step 214 produces a signal for starting the next pressurizing work cycle. The number N of samplings coincides with an integration value of reference pulses, and therefore detection pulses for the N-th sampling are easily searched for in the memory. In the case where any integration value of reference pulses is not used, the value N may be determined also from the memory address. In such a case, step 203 may be omitted. Unlike in the present embodiment where count values of detection pulses against generation of reference pulses are compared with each other, the change in the number of detection pulses between reference pulses may be determined as another embodiment. A flowchart for determining an average value in such an embodiment is obtained by including steps 205 and 206 in FIG. 19 changed to have the same contents as steps 221 and 222 in FIG. 21. In a flowchart for comparison process according to this embodiment, step 212 in FIG. 20, as shown by step 231 of FIG. 22, is for checking to see whether the difference between the reference value and the detection pulse count value for the N-th sampling less the detection pulse count value for the (N−1)th sampling exceeds a tolerance y. According to a further embodiment, the count value of reference pulses is not confined to an integration value, but the sum of a detection pulse count value and a reference pulse count value may be used for comparison or the difference between the two count values may be compared. A flowchart associated with such an embodiment is realized by including step 205 in FIG. 19 and step 212 in FIG. 20 for determining the sum or difference between the reference pulse count value N and a corresponding detection pulse count value.

Although embodiments of the present invention are explained above with reference to an abnormal load detection system for a former, the present invention is applicable with equal effect also to other pressurizing apparatuses than the former.

I claim:

1. An abnormal load detection apparatus for a pressurizing apparatus, comprising:

power generation means adapted for rotational motion and including a motor;

converter means for converting the rotative kinetic energy into linear kinetic energy;

pressurizing means for applying the linear kinetic energy to the work;

means for detecting the power consumption of said motor and converting it into an electrical signal;

means for sampling said electrical signal at selected one of a plurality of pressurizing positions or at selected one of a plurality of pressurizing time points;

means for storing a normal value of the electrical signal corresponding to said sampling points;

means for comparing a value obtained by said sampling with the normal value stored; and means for deciding on an abnormal load condition when the result of said comparison exceeds a predetermined value.

2. An apparatus according to claim 1, wherein said means for detecting the power consumption and converting it into an electrical signal includes means for converting the power consumption detected into a voltage according to the magnitude of the power, means for converting the voltage into a frequency and means for counting the frequency; and, said sampling means includes means for sampling a count value of said counter.

3. An apparatus according to claim 2, wherein said counting means includes means for counting the number of pulses generated between predetermined sampling processes as an output of said voltage-frequency conversion.

4. An apparatus according to claim 2, wherein said counting means includes means for integrating and counting the number of pulses of said voltage-frequency conversion output.

5. An apparatus according to claim 2, wherein said sampling means includes:

means for detecting the rotational position cf power generation section in rotational motion;

pulse generation means operated by a signal from said rotational position detection means; and means for sampling the count value by a pulse from said pulse generation means.

6. An apparatus according to claim 5, wherein said pulse generation means includes an oscillator.

7. An apparatus according to claim 5, wherein said pulse generation means includes means for counting the time according to a program.

8. An apparatus according to claim 2, wherein said sampling means includes:

means for detecting the position of a pressurizing section in linear motion;

pulse generation means energized by a signal from said position detection means; and means for sampling the count value by a pulse from said pulse generation means.

9. An apparatus according to claim 8, wherein said pulse generation means includes an oscillator.

10. An apparatus according to claim 8, wherein said pulse generation means includes means for counting the time according to a program.

11. An apparatus according to claim 2, wherein said sampling means includes means mounted on a rotary shaft of the power generation section in rotary motion for performing the sampling operation by a pulse from a rotary pulse encoder.

12. An apparatus according to claim 2, wherein said sampling means includes means mounted on the pressurizing section in linear motion for performing the sampling operation by a pulse from a linear pulse encoder.

13. An abnormal load detection apparatus for a pressurizing apparatus, comprising:

power generation means adapted for rotational motion and including a motor;

converter means for converting the rotative kinetic energy into linear kinetic energy;

pressurizing means for applying the linear kinetic energy to the work;

means for detecting the power strain and converting it into an electrical signal, which is mounted on a frame of said pressurizing means;

means for sampling said electrical signal at selected one of a plurality of pressurizing positions or at selected one of a plurality of pressurizing time points;

means for storing a normal value of the electrical signal corresponding to said sampling points;

means for comparing a value obtained by said sampling with the normal value stored; and means for deciding on an abnormal load condition when the result of said comparison exceeds a predetermined value.

14. An apparatus according to claim 13, wherein said means for converting a mechanical strain into an electrical signal includes means for converting the electrical signal into a frequency and means for counting the frequency, and said sampling means includes means for sampling a count value of said counter.

15. An apparatus according to claim 1 or 13, wherein said sampling means includes:

means for analog-digital (A/D) converting said electrical signal; and means for storing a value obtained by said A/D converting means, and said comparator means includes:

means for adding a predetermined number of A/D converted values; and means for comparing the sum obtained with the normal value.

16. An abnormal load detection apparatus for pressurizing apparatus, comprising:

power generation means adapted for rotational motion;

conversion means for converting a rotational kinetic energy into a linear kinetic energy;

pressurizing means adapted for linear motion by said linear kinetic energy;

a rotary pulse encoder for detecting an amount of rotational displacement of a rotary shaft in said rotational motion;

a linear pulse encoder for detecting an amount of linear displacement of said pressurizing means;

means for sampling pulses generated from said rotary pulse encoder in synchronism with the pulses generated from said linear pulse encoder;

means for storing the number of said pulses generated from said rotary pulse encoder between the $(N-1)$th, where N is an integer, sampling operation and the N-th sampling operation;

means for comparing the number of said pulses generated from said rotary pulse encoder between the $(N-1)$th sampling operation and the N-th sampling operation which are effected in a new pressurizing process, with said stored number of said pulses; and means for producing a signal notifying a fault when the amount of said rotation displacement sampled anew exceeds the stored amount of said rotational displacement by a predetermined tolerance.

17. An abnormal detection apparatus for pressurizing apparatus comprising:

power generation means adapted for rotational motion;

conversion means for converting a rotational kinetic energy into a linear kinetic energy;

pressurizing means adapted for linear motion by said linear kinetic energy;

a rotary pulse encoder for detecting an amount of rotational displacement of a rotary shaft in said rotational motion;

a linear pulse encoder for detecting an amount of linear displacement of said pressurizing means;

means for sampling pulses generated from said linear pulse encoder in synchronism with the pulses generated from said rotary pulse encoder;

means for storing the number of said pulses generated from said rotary pulse encoder between the (N−1), where N is an integer, sampling operation and the N-th sampling operation;

means for comparing the number of said pulses generated from said rotary pulse encoder between the (N−1)th sampling operation and the N-th sampling operation which are effected in a new pressurizing process, with said stored number of said pulses; and means for producing a signal notifying a fault when the amount of said rotation displacement sampled anew exceeds the stored amount of said rotational displacement by a predetermined tolerance.

18. An apparatus according to claim 16 or 17, wherein said storing means stores an average value of the first number n, where n is a given integer, of a plurality of continuously conducted pressurizing processes.

19. An apparatus according to claim 16 or 17, wherein said storing means stores an average value of a number n, where n is a given integer, of pressurizing processes continuously conducted.

20. An apparatus according to claim 16 or 17, wherein said storing means includes:

means for selecting the first number n, where n is a given integer, of a plurality of continuously conducted pressurizing processes or a number n, where n is a given integer, of pressurizing processes continuously conducted; and means for storing an average value of the first number n, where n is a given integer, of a plurality of continuously conducted pressurizing processes or an average value of a number n, where n is a given integer, of pressurizing processes continuously conducted.

21. A method of abnormal load detection of an apparatus having a pressurizing area in which an object is pressed by a movable member, comprising the steps of:

detecting a power consumption of a motor which generates a power for pressurizing operation;

converting said detecting power consumption into an electrical signal;

sampling said electrical signal at selected one of a plurality of pressurizing positions or at selected one of a plurality of points of pressurizing time;

comparing a sampled value with a normal value of said electrical signal substantially corresponding to said sampling point; and deciding an abnormal load condition when the result of the comparison exceeds a predetermined tolerance.

22. A system according to claim 21, wherein said step of converting a load change into an electrical signal includes the steps of converting the electrical signal into a frequency and counting the frequency; and said step of sampling includes the step of sampling the count value of said counter.

23. A method of abnormal load detection of an apparatus having a pressurizing area in which an object is pressed by a movable member, comprising the steps of:

detecting a mechanical strain by a mechanical strain sensor which is mounted on a frame of a pressurizing apparatus;

converting said detected mechanical strain into an electrical signal;

sampling said electrical signal at selected one of a plurality of pressurizing positions or at selected one of a plurality of points of pressurizing time;

comparing a sampled value with a normal value of said electrical signal substantially corresponding to said sampling point; and deciding an abnormal load condition when the result of the comparison exceeds a predetermined tolerance.

24. A method according to claim 21 or 23, wherein said sampling step includes the steps of:

analog-digital (A/D) converting said electrical signal; and storing a value obtained by said A/D converting step, and said comparing step includes the steps of:

adding a predetermined number of A/D converted values; and comparing the sum obtained with the normal value.

* * * * *

UNITED STATES PATENT AND TRADEMARK OFFICE

CERTIFICATE OF CORRECTION

PATENT NO. : 4,979,401

DATED : December 25, 1990

INVENTOR(S) : Naoyuki Maeda

It is certified that error appears in the above-identified patent and that said Letters Patent is hereby corrected as shown below:

Column 11, line 66, claim 13, change "the power" to --a mechanical--.

Column 13, line 20, claim 17, change "rotation" to --linear--.

Column 13, line 21, claim 17, change "rotational" to --linear--.

Signed and Sealed this

Fourteenth Day of July, 1992

*Attest:*

DOUGLAS B. COMER

*Attesting Officer*

*Acting Commissioner of Patents and Trademarks*